United States Patent [19]
Miura et al.

[11] Patent Number: 4,848,177
[45] Date of Patent: Jul. 18, 1989

[54] AUTOMATIC TRANSMISSION

[75] Inventors: Masakatsu Miura; Kazuhisa Ozaki, both of Anjo, Japan

[73] Assignee: Aisin-Warner Kabushiki Kaisha, Anjo, Japan

[21] Appl. No.: 167,267

[22] Filed: Mar. 11, 1988

[30] Foreign Application Priority Data

May 2, 1987 [JP] Japan .................. 62-109180

[51] Int. Cl.$^4$ .................. F16H 57/10; F16D 13/74; F16D 41/06
[52] U.S. Cl. .................. 74/467; 74/701; 74/785; 184/6.12; 184/31; 188/82.84; 188/264 B; 192/45; 192/113 B
[58] Field of Search .............. 74/467, 701, 754, 785; 192/45, 113 B; 188/30, 61, 82.84, 264 B, 264 E; 184/6.12, 31

[56] References Cited

U.S. PATENT DOCUMENTS

| | | | |
|---|---|---|---|
| 2,408,336 | 9/1946 | Orr | 184/6.12 |
| 2,968,190 | 1/1961 | Orr | 74/467 |
| 2,971,405 | 2/1961 | Flinn | 74/754 X |
| 3,223,196 | 12/1965 | Stott | 184/31 X |
| 4,191,279 | 3/1980 | Brown | 188/82.84 |
| 4,380,179 | 4/1983 | Kubo et al. | 74/762 |
| 4,495,830 | 1/1985 | Yasue et al. | 74/467 |

Primary Examiner—Allan D. Herrmann
Attorney, Agent, or Firm—Varndell Legal Group

[57] ABSTRACT

An automatic transmission having a one-way brake in which an outer race is fixed to a rotational member of a planetary gear unit or to a transaxle case and, conversely, an inner race is fixed to the transaxle case or the rotational member of the planetary gear unit, characterized in that the rotational member is provided with an oil infeed plate co-rotatable therewith. Oil dispersed from the input shaft of the transmission is introduced to the one-way brake by pressure produced by the centrifugal force of the rotating oil infeed plate. Thus, burnout of the one-way clutch is prevented since the clutch is sufficiently lubricated at the time of overrun.

9 Claims, 8 Drawing Sheets

FIG. 7

|   | C₁ | C₂ | B₁ | B₂ | F₁ |
|---|---|---|---|---|---|
| 1ST | ○ |   |   | ◌ | ○ |
| 2ND | ○ |   | ○ |   |   |
| 3RD | ○ | ○ |   |   |   |
| REV |   | ○ |   | ○ |   |

FIG. 9

|   | C₁ | C₂ | C₀ | B₁ | B₂ | F₁ |
|---|---|---|---|---|---|---|
| 1ST | ○ |   |   |   | ◌ | ○ |
| 2ND | ○ |   |   | ○ |   |   |
| 3RD | ○ |   | ○ |   |   |   |
| 4TH |   |   | ○ | ○ |   |   |
| REV |   | ○ |   |   | ○ |   |

AUTOMATIC TRANSMISSION

BACKGROUND OF THE INVENTION

This invention relates to the structure of an automatic transmission for assuring the lubrication of a one-way brake within the automatic transmission.

FIG. 10 illustrates the mounting structure of a one-way brake in accordance with the prior art. A clutch C2, a first brake B1, a planetary gear unit 7 and a second brake B2 are arranged in the order mentioned, starting from the engine output side, about an input shaft 1 of an automatic transmission mechanism. A hollow shaft 8 is freely rotatably fitted on the input shaft 1. The planetary gear unit 7 is of the dual type and includes a sun gear S formed on the hollow shaft 8, and a carrier CR supporting a pinion P1 meshing with the ring gear R2.

The clutch C2 is interposed between a sun gear input flange 9, which is fitted on the hollow shaft 8, and a hub 10 fitted on the input shaft 1, and is engaged and disengaged by a piston 12 within a clutch cylinder 11. A brake drum 13 is arranged about the clutch cylinder 11. The first brake B1, which comprises a band brake, is arranged so as to contact and separate from the drum 13.

A counterdrive gear 14 is arranged between the clutch C2 and the planetary gear unit 7. The drive gear 14 is splined at its inner periphery to the carrier CR and has an outer periphery freely rotatably supported via a bearing 16 on a bearing outer race 50 attached to a transaxle case 2. The bearing outer race 50 is splined to a cylinder portion 51 of the transaxle case 2 and to an inner race 52 of a one-way brake F. Rotation of the one-way brake F is stopped by the cylinder portion 51 via the splines. In the axial direction of the bearing outer race 50, the right end is fixed by the end face of the cylinder portion 51, and movement in the leftward direction is prevented by a snap ring 53. The one-way brake F has an outer race 54 welded to the ring gear R2 of the planetary gear unit 7, and the second brake B2, which is of disc-type, is interposed between the outer periphery of the ring gear R2 and the axle case 2. The brake B2 is engaged and released by a piston 17.

In this conventional automatic transmission, the one-way brake F is lubricated as follows. Oil which has been dispersed from the input shaft 1 from the inner side of the inner race 52 on the inner peripheral side of the brake F descends under the force of gravity and is scraped up and collected for lubrication. The oil is also forcibly supplied from the transaxle case 2.

However, in the above arrangement wherein the one-way brake is fixed on its inner peripheral side, the inflow of the lubricating oil is unsatisfactory. In particular, the amount of lubrication is insufficient in an arrangement where only the force of gravity is relied upon to cause the oil to descend. This makes it necessary to increase the amount of lubricating oil supplied, as a result of which the discharge capacity of the oil pump must be increased. Furthermore, since the one-way brake is locked only in first speed and in reverse and is released in other speed ratios, the brake is often in a slipping state. When the outer peripheral side is rotated at high speed in such case, the lubricating oil is scattered to the outside by centrifugal force, thereby inviting insufficient lubrication. If rotation of the outer peripheral side continues for an extended period of time, there is an increase in the amount of heat produced by the sliding of the lubricated portions. If the amount of lubricating oil is inadequate at such time, the cooling effect is unsatisfactory and, hence, the sliding portions of the one-way brake tend to burn out.

In the arrangement where the oil is forcibly supplied from the transaxle case 2, sealing members and the machining of oil supply holes are required. Moreover, in order to prevent leakage of oil to other components, bushes and seal rings are required. The result of these requirements is higher cost.

SUMMARY OF THE INVENTION

An object of the present invention is to provide an automatic transmission in which the one-way clutch is lubricated with the minimum amount of oil required.

According to the present invention, the foregoing object is attained by providing an automatic transmission having a one-way brake in which an outer race is fixed to a rotational member of a planetary gear unit or to a transaxle case and, conversely, an inner race is fixed to the transaxle case or the rotational member of the planetary gear unit, characterized in that the rotational member is provided with an oil infeed plate co-rotatable therewith, centrifugal force produced by rotation of the plate generating a pressure for introducing oil, dispersed from an input shaft, to the one-way brake.

Thus, in accordance with the invention, burn-out of the one-way brake is prevented since the clutch is sufficiently lubricated at the time of overrun. In addition, lubrication is performed with the minimum required amount of oil since lubrication from the input shaft need not be large. This makes it possible to lighten the burden on an oil pump and reduce the size of the oil pump gear. Furthermore, costs can be kept low since forced lubrication from the case is unnecessary.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view for describing the operation of the automatic transmission of FIG. 6;

FIG. 9 is a view for describing the operation of the automatic transmission of FIG. 8.

DESCRIPTION OF THE PREFERRED EMBODIMENT

Figure 5:
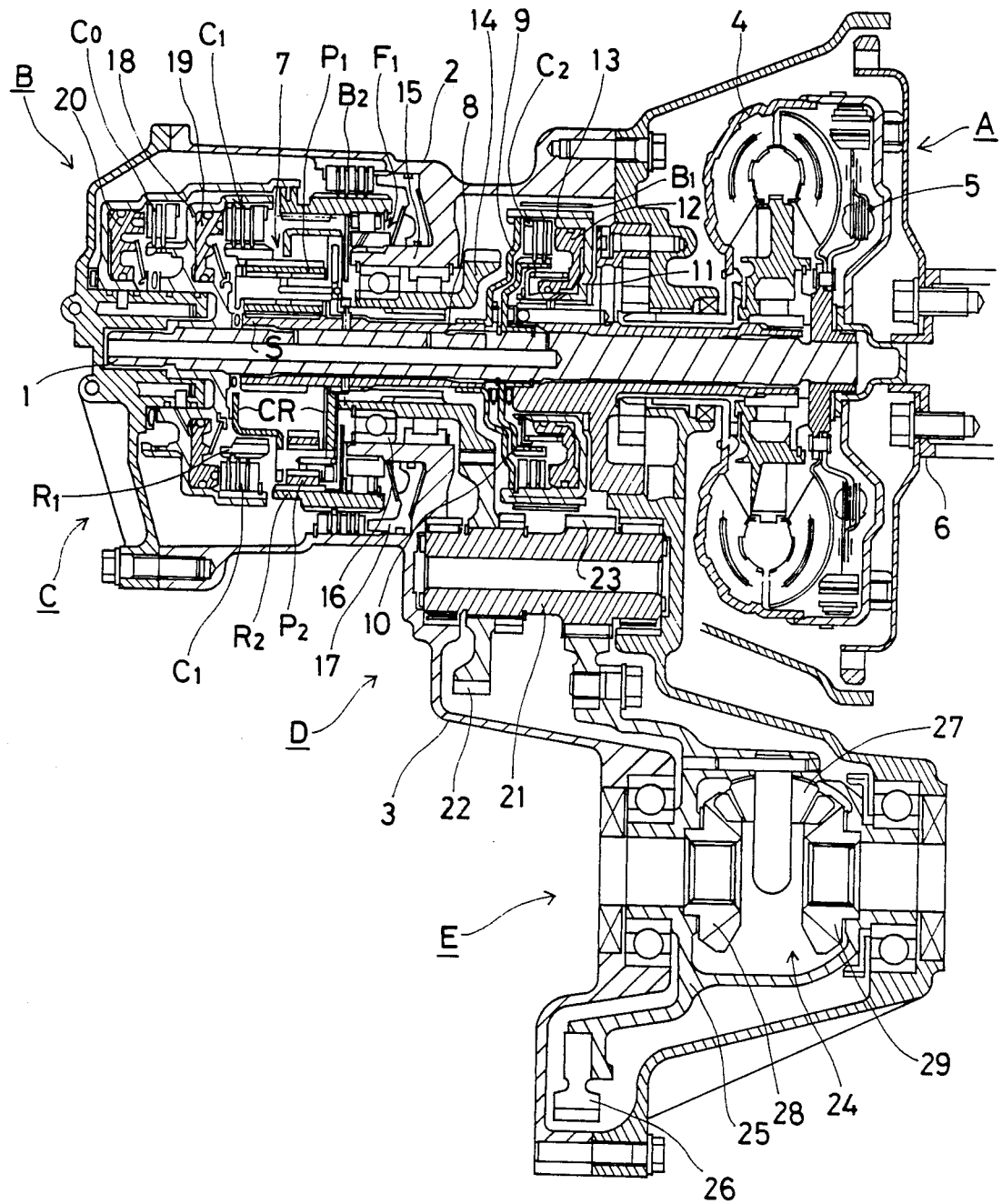
FIG. 5 is a sectional view illustrating the overall mechanism of an automatic transmission to which the present invention is applied.

FIG. 5 illustrates an automatic transmission to which the present invention is applied. The automatic transmission comprises a torque converter section A, a four-speed automatic transmission mechanism B, a three-speed automatic transmission mechanism C, an output gear mechanism D, and a differential gear mechanism E. For the sake of convenience, the upper half (with respect to the input shaft 1) of FIG. 5 shows the structure of the four-speed automatic transmission mechanism B, and the lower half shows the structure of the three-speed automatic transmission mechanism C. Structurally, the only difference between the mechanisms B and C is the presence of a clutch Co in mechanism B; in other aspects, the three- and four-speed structures are identical. These mechanisms are accommodated in the transaxle case 2 and a transaxle housing 3, which are joined together into a whole.

The torque converter section A comprises a torque converter 4 and a centrifugal-type lock-up clutch 5. The rotating force of the engine is transmitted from the crank shaft 6 to the input shaft 1 inside the automatic transmission mechanisms B, C via an oil flow in the torque converter 4 or a mechanical connection effected by the lock-up clutch 5.

The three-speed automatic transmission mechanism B and four-speed automatic transmission mechanism C include the second clutch C2, first brake B1, planetary gear unit 7 and a first clutch C1 arranged in the order mentioned, starting from the engine output side, about the input shaft 1. The hollow shaft 8 is freely rotatably fitted on the input shaft 1. The planetary gear unit 7 is of the dual type and includes the sun gear S formed on the hollow shaft 8, and the carrier CR supporting the first pinion P1 meshing with these gears.

The second clutch C2 is interposed between the sun gear input flange 9, which is fitted on the hollow shaft 8, and the C-2 hub 10 fitted on the input shaft 1, and is engaged and disengaged by the piston 12 within the clutch cylinder 11. The brake drum 13 is arranged about the clutch cylinder 11. The first brake B1, which comprises a band brake, is arranged so as to contact and separate from the drum 13.

The counterdrive gear 14 is arranged at substantially the central portion of the automatic transmission mechanisms B, C. The drive gear 14 is splined at its inner periphery to the carrier CR and has an outer periphery freely rotatably supported via a bearing 16 on a cylinder portion 15 of the transaxle case 2. The one-way brake F1 is splined between the cylinder portion 15 and the ring gear R2 of the planetary gear unit 7. The disc-type second brake B2 is interposed between the outer periphery of the ring gear R2 and the axle case 2 and is engaged and disengaged by the piston 17.

The first clutch C1 is interposed between a cylinder 18, which is splined to the input shaft 1, and the outer periphery of the ring gear R1 of the planetary gear unit 7. The clutch C1 is engaged and disengaged by a piston 19. In the case of the four-speed automatic transmission mechanism B, the third clutch Co is provided and is interposed between the cylinder 18 and the outer periphery of the ring gear R2 of planetary gear unit 7. The clutch Co is engaged and disengaged by a piston 20.

The output gear mechanism D has a countershaft 21 freely rotatably supported between the transaxle case 2 and transaxle housing 3. Fitted on the shaft 21 are a counter-driven gear 22 meshing with the counterdrive gear 14, and a differential drive gear 23. The differential gear mechanism E has a differential gear unit 24 and a ring gear mounting case 25. The mounting case 25 has a ring gear 26 meshing with the differential drive gear 23 and constructs a differential carrier supporting a differential pinion 27 of the differential gear unit 24. The differential gear unit 24 has left and right side gears 28, 29 meshing with the differential pinion 27. Power is transmitted from the left and right side gears 28, 29 to the left and right wheels.

Figure 6:
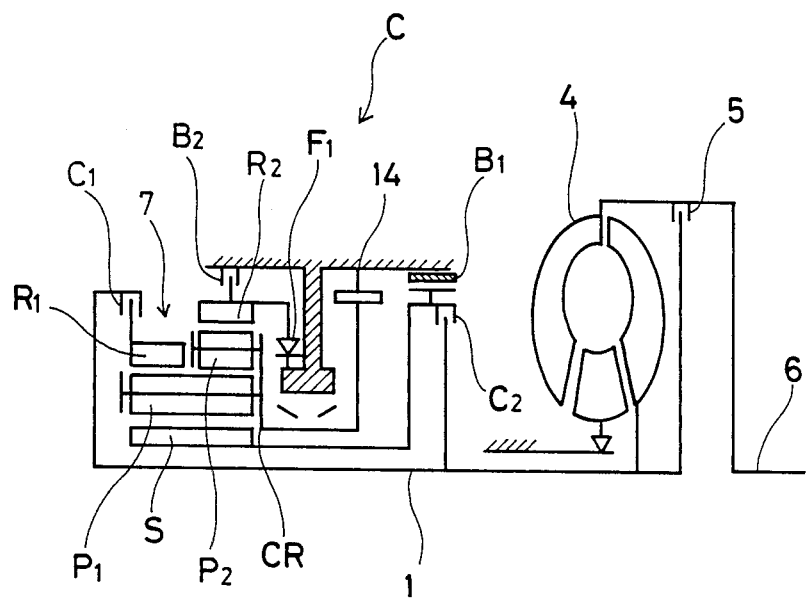
FIG. 6 is a schematic view of a three-speed automatic transmission mechanism in FIG. 5.

The operation of the three-speed automatic transmission mechanism C having the foregoing construction will now be described with reference to a gear train shown in FIG. 6 and an operation table shown in FIG. 7.

In first gear, the first clutch C1 is engaged, whereupon the rotating force of the input shaft 1 is transmitted to the ring gear R1 via the first clutch C1. Since rotation of the ring gear R2 is prevented by the one-way brake F1 at this time, the common carrier CR is rotated forwardly at greatly reduced speed while the sun gear S idles in the reverse direction. The rotation of the carrier CR is taken out by the counterdrive gear 14.

In second gear, the first clutch C1 is engaged and the first brake B1 is actuated, so that the rotation of the sun gear S is stopped by the first brake B1. As a result, the rotation of the ring gear R1, which receives the rotating force from input shaft 1, is transferred to the carrier CR, which is rotated forwardly at an even slower speed while the ring gear R2 idles in the reverse direction. The rotation of the carrier CR is taken out by the counterdrive gear 14. This represents second gear (second speed).

In third gear, the second clutch C2 is engaged in addition to the first clutch C1, so that the rotation of the input shaft 1 is transmitted to the ring gear R1 and sun gear S, with the planetary gear unit 7 rotating in unison. In consequence, the carrier CR also co-rotates and the speed taken off the counterdrive gear 14 is the same as that of the input shaft 1.

In the reverse range, both the second clutch C2 and second brake B2 are engaged, so that the rotating force of input shaft 1 is transmitted to the sun gear S via the second clutch C2. Since the ring gear R2 is locked at this time due to the braking action of the second brake B2, the carrier CR is rotated in the reverse direction while the ring gear R1 is rotated in the reverse direction. This reverse rotation of the carrier CR is taken out by the counterdrive gear 14.

In first gear at coasting, the one-way brake F1 is free but the second brake B2 is engaged in addition to the first clutch C1, so that the ring gear R2 is locked by the brake B2. Consequently, the first-gear state is maintained and engine braking operates in an effective manner.

Figure 8:
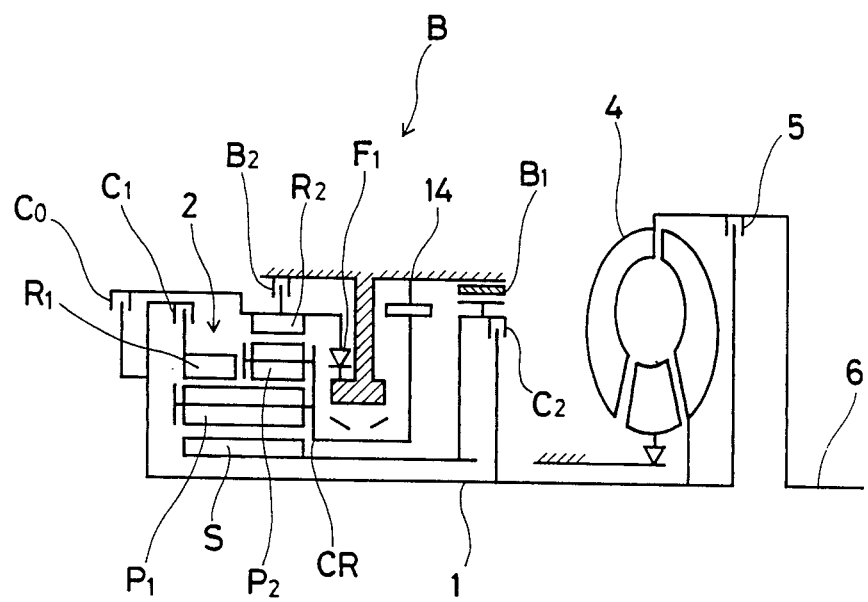
FIG. 8 is a schematic view of a four-speed automatic transmission mechanism in FIG. 5.
Figure 10:
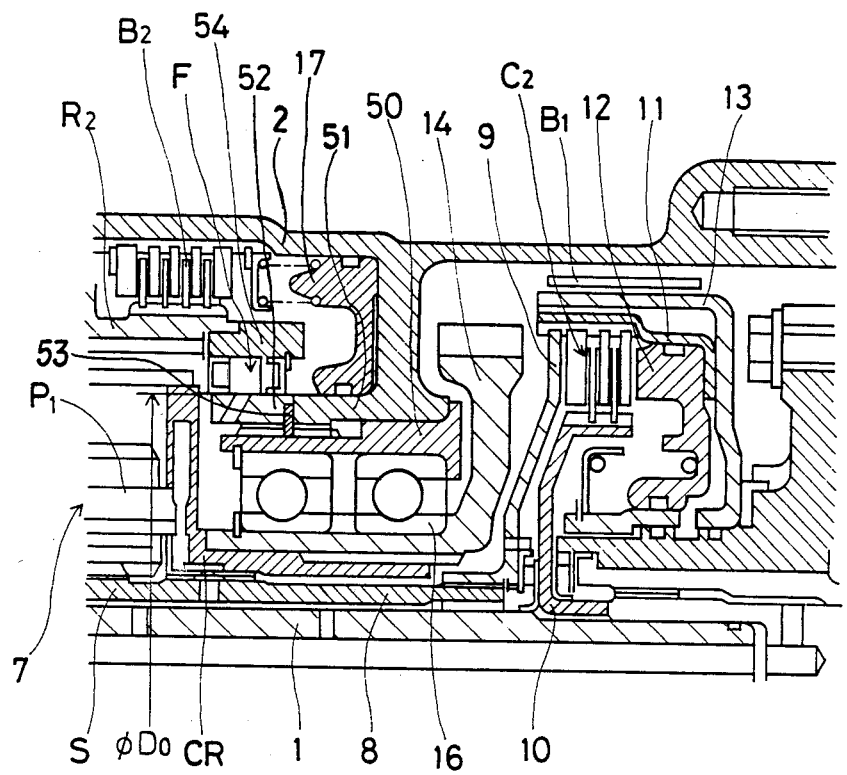
FIG. 10 is a partial sectional view of an automatic transmission according to the prior art.

The operation of the four-speed automatic transmission mechanism B having the construction set forth above will now be described with reference to a gear train shown in FIG. 8 and an operation table shown in FIG. 9. Since operation in reverse and in first and second gears is the same as in the three-speed automatic transmission mechanism C just explained, this operation need not be described again.

In third gear, the third clutch Co is engaged in addition to the first clutch C1, so that the rotating force of the input shaft 1 is transmitted to the ring gear R1 via the clutch C1 and, at the same time, to the ring gear R2 via the clutch Co. The elements of the planetary gear unit 7 rotate in unison. Accordingly, the carrier CR also rotates in unison and the rotational speed taken off the counter drive gear 14 is the same as that of the input shaft 1.

In fourth gear, the first clutch C1 is released and the first brake B1 is actuated, whereupon the rotating force of the input shaft 1 is transmitted to the ring gear R2 via the clutch C1. Since the sun gear S is in the locked state at this time, the carrier CR rotates at high speed while the ring gear R1 is idled at increased speed. The high-speed rotation of the carrier CR is taken out at the counterdrive gear 14 as overdrive.

The automatic transmission having the foregoing construction is small in size since the carrier CR and sun gear S are integrated into a single body. Furthermore, since the counterdrive gear 14 is arranged at substantially the central portion of the automatic transmission mechanisms, the transmission path is two-way so that size in the axial direction can be reduced. Moreover, the first clutch C1 is situated on the outermost side relative to the axial direction in the three-speed automatic transmission mechanism C, and the third clutch Co is arranged on the outer side of the first clutch C1 in the four-speed automatic transmission mechanism B. Therefore, a three- or four-speed automatic transmission can be obtained by a slight modification, namely the addition of the third clutch Co, etc. This makes it possible to manufacture a wide variety of components in small quantities, which is required in the diversification of automotive vehicles, without inviting a large increase in cost.

A structure for lubricating the one-way brake F1 in the foregoing automatic transmission will now be described with reference to FIGS. 1 through 4.

Figure 1:
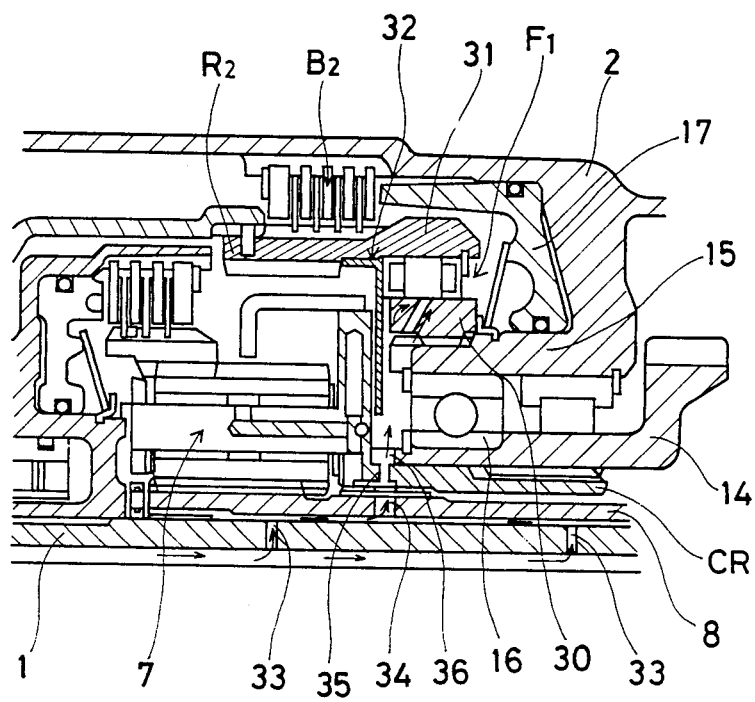
FIG. 1 is a partial sectional view illustrating a first embodiment of an automatic transmission according to the present invention.

In FIG. 1, the counterdrive gear 14 is arranged at substantially the central portion of the automatic transmission mechanism. The drive gear 14 is splined at its inner periphery to the carrier CR and has an outer periphery freely rotatably supported via the bearing 16 on the cylinder portion 15 of the transaxle case 2. An inner race 30 of the one-way brake F1 is splined to the outer peripheral surface of the cylinder portion 15, and an outer race 31 of the one-way brake F1 is adapted to rotate in unison with the ring gear R2 of the planetary gear unit 7. The disc-type second brake B2 is interposed between the outer periphery of the ring gear R2 and the axle case 2 and is engaged and disengaged by the piston 17.

An oil infeed plate 32 is press-fitted onto the inner peripheral surface of the ring gear R2. A lubricating oil is dispersed through an oil hole 33 in the input shaft 33, an oil hole 34 in the hollow shaft 8, an oil hole 35 in the carrier CR, and a notch 36 in the counterdrive gear 14. The dispersed oil is collected by the oil infeed plate 32 and introduced to the one-way brake F1. Also, owing to the rotation of the plate 32, pressure is produced which feeds into the one-way clutch, which has attached itself to the oil infeed plate 32, whereby forced lubrication is achieved. It should be noted that the ring gear R2 and oil infeed plate 32 may be fixedly joined to each other by caulking instead of press-fitting.

Figure 2A:
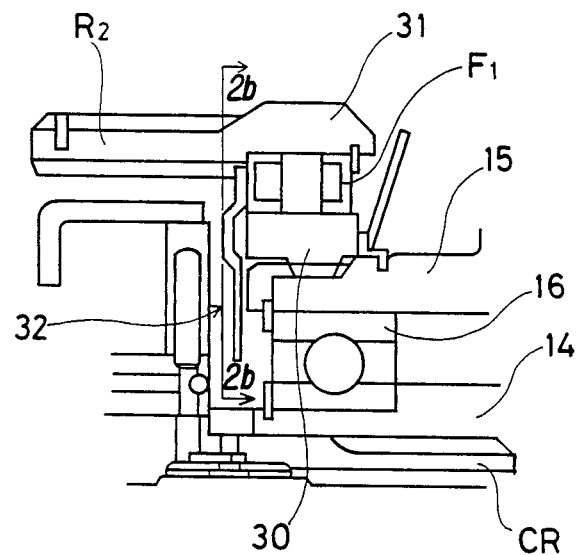
FIGS. 2(a) and 2(b) are partial sectional views illustrating a second embodiment of an automatic transmission according to the present invention.
Figure 2B:
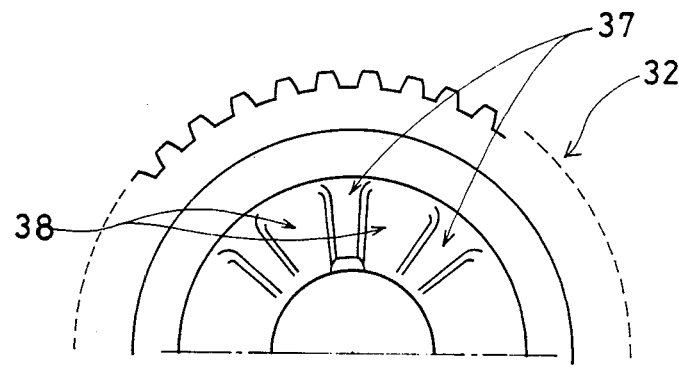

FIGS. 2(a) and 2(b) illustrate a second embodiment of the present invention, in which FIG. 2(a) is a sectional view and FIG. 2(b) is a sectional view taken along line 2(b)—2(b) of FIG. 2(a). Here the oil infeed plate 32 is formed to include radially extending projections 37 and recesses 38 in order to heighten the oil infeed force and increase the ridigity of the plate 32 so that the plate will not be deformed by the infeed pressure. The oil infeed plate 32 and ring gear R2 are joined to each other by splining.

In this embodiment, the projections 37 and recesses 38 are formed to extend radially. However, the invention is not limited to this arrangement. For example, the projections and recesses can be formed as concentric circles or in random manner if desired so long as the surface area of the plate is increased.

Figure 3:
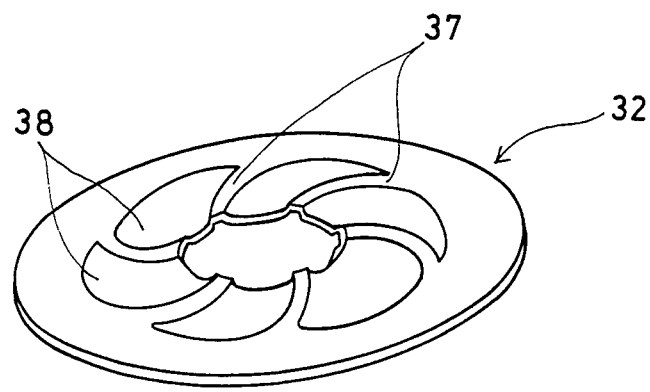
FIG. 3 is a perspective view illustrating a third embodiment of an automatic transmission according to the present invention.

FIG. 3 illustrates a third embodiment of the invention, in which the projections 37 and recesses 38 of FIG. 2 are formed in spiraling fashion in the direction of rotation to increase the oil infeed force and facilitate the introduction of oil to the outer peripheral side.

Figure 4:
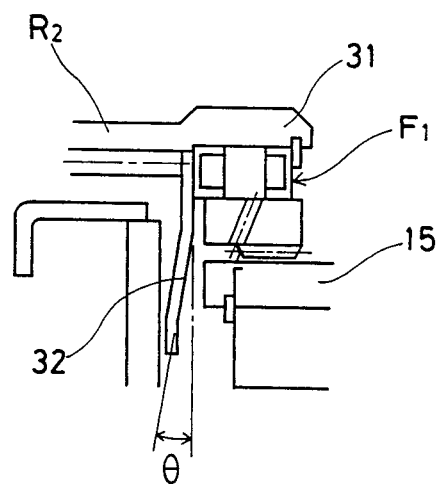
FIG. 4 is a partial sectional view illustrating a fourth embodiment of an automatic transmission according to the present invention.

FIG. 4 illustrates a fourth embodiment of the invention, in which the oil infeed plate 32 is imparted with an inclination $\theta$ in such a manner that the surface of the oil feed plate 32 approaches the one-way brake F1 the further the distance along the radius of the plate, thereby increasing the oil infeed force in the vicinity of the one-way clutch.

It should be noted that the present invention is not limited to the foregoing embodiments but can be modified in various ways.

For example, in the foregoing embodiments, the oil infeed plate 32 is provided on an outer peripheral rotational member which rotates when the one-way brake overruns. However, the invention can also be applied to an arrangement in which the inner race rotates and the outer race is fixed, in which case effects similar to those described above can be obtained by providing the oil infeed plate 32 on the rotational member on the inner peripheral side.

In accordance with the present invention as described above, the oil infeed plate 32 is provided on a rotational member which rotates when the one-way brake overruns. Therefore, burn-out of the one-way brake can be prevented since the brake is sufficiently lubricated at the time of overrun. In addition, lubrication is performed with the minimum required amount of oil since lubrication from the input shaft need not be large. This makes it possible to lighten the burden on an oil pump and reduce the size of the oil pump gear. Furthermore, costs can be kept low since forced lubrication from the case is unnecessary.

What we claim is:

1. An automatic transmission having a one-way brake in which an an outer race is fixed to a rotational member of a planetary gear unit and an inner race is fixed to the transaxle case, characterized in that said rotational member is provided with an oil infeed plate co-rotatable therewith, centrifugal force produced by rotation of said plate generating a pressure for introducing oil, dispersed from an input shaft, to the one-way brake.

2. The automatic transmission according to claim 1, characterized in that the surface of said oil infeed plate is provided with projections and recesses.

3. The automatic transmission according to claim 2, characterized in that said projections and recesses are formed radially of said oil infeed plate.

4. The automatic transmission according to claim 3, characterized in that said projections and recesses are formed in spiral fashion in a direction of rotation.

5. The automatic transmission according to claim 1, characterized in that said oil infeed plate is inclined in such a manner that a surface of said oil feed plate grows progressively nearer to said one-way brake the further the distance along the radius of said oil infeed plate.

6. The automatic transmission according to claim 1, characterized in that co-rotation of said rotational member and said oil infeed plate is achieved by securing them together by one of splining, press-fitting and securing them together by caulking.

7. The automatic transmission according to claim 1, characterized in that the surface of said oil infeed plate is provided with projections and recesses.

8. The automatic transmission according to claim 7, characterized in that said projections and recesses are formed radially of said oil infeed plate.

9. The automatic transmission according to claim 8, characterized in that said projections and recesses are formed in spiral fashion in a direction of rotation.

* * * * *